United States Patent
Masuhara et al.

(10) Patent No.: US 7,318,232 B2
(45) Date of Patent: Jan. 8, 2008

(54) OPTICAL DISC AND DISC CARTRIDGE CONTAINING THE SAME

(75) Inventors: Shin Masuhara, Tokyo (JP); Shinsuke Kishi, Saitama (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 487 days.

(21) Appl. No.: 11/064,094

(22) Filed: Feb. 24, 2005

(65) Prior Publication Data

US 2005/0226137 A1    Oct. 13, 2005

(30) Foreign Application Priority Data

Mar. 9, 2004    (JP)    ............................ 2004-066237

(51) Int. Cl.
*G11B 7/24*    (2006.01)
(52) U.S. Cl. ................................... 720/718
(58) Field of Classification Search ............ 720/718
See application file for complete search history.

(56) References Cited

U.S. PATENT DOCUMENTS

| | | | | |
|---|---|---|---|---|
| 5,822,297 A * | 10/1998 | Fujisawa | .................... | 720/740 |
| 6,108,298 A * | 8/2000 | Miyazaki et al. | ........... | 720/727 |
| 6,236,541 B1 * | 5/2001 | Takahashi | .................. | 360/133 |
| 6,239,949 B1 * | 5/2001 | Funawatari et al. | ........ | 360/133 |
| 6,396,800 B1 * | 5/2002 | Yamashita | .................. | 720/729 |

FOREIGN PATENT DOCUMENTS

EP    0 270 182 A2    6/1988
JP    9-282712    10/1997

* cited by examiner

*Primary Examiner*—A. J. Heinz
*Assistant Examiner*—Mark Blouin
(74) *Attorney, Agent, or Firm*—Oblon, Spivak, McClelland, Maier & Neustadt, P.C.

(57) ABSTRACT

A large capacity recording medium is formed by bonding at least two disc-shaped recording plates to provide a structure adapted to absorb any manufacturing errors in the direction of the height of the recording medium.

11 Claims, 8 Drawing Sheets

OPTICAL DISC AND DISC CARTRIDGE CONTAINING THE SAME

BACKGROUND OF THE INVENTION

1. Field of the Invention

This invention relates to an optical disc formed by bonding a pair of optical disc substrates and also to a disc cartridge containing such an optical disc.

This application claims priority of Japanese Patent Application No. 2004-066237, filed on Mar. 9, 2004, the entirety of which is incorporated by reference herein.

2. Description of Related Art

Optical discs have been and being popularly used as information recording mediums for information processing apparatus such as personal computers, recording/reproduction apparatus such as optical disc players and video cameras and television game machines.

Efforts have been and are being paid to improve the recording density and improve the recording capacity of optical discs of the type under consideration. For example, optical discs with a diameter of 8 cm having a recording capacity of 1.4 gigabytes (GB) and capable of recording a movie of about 30 minutes have been offered. Furthermore, in the case of DVDs that are a type of optical disc, DVDs with a diameter of 8 cm having a recording capacity of 1.8 GB and capable of recording a movie of about 2 hours have been proposed.

On the other hand, portable type recording/reproduction apparatus such as optical disc players and video cameras and also portable type television game machines adapted to use optical discs as recording mediums are commercially available. Such portable appliances are required to be more downsized and thin in view of convenience of mobility and easy use.

Thus, there is a strong demand for downsized optical discs having a large capacity and adapted to be used as recording mediums for recording/reproduction apparatus and television game machines that are also downsized and made thin.

To meet this demand, optical discs having a plurality of recording layers or formed by bonding a plurality of disc substrates, each having a recording layer, have been proposed in an attempt to realize a large capacity and compactness.

Japanese Patent Application Laid-Open Publication No. 9-282712 (Patent Document 1) describes an optical disc having a plurality of recording layers of the type under consideration. The optical disc described in Patent Document 1 is formed by bonding a pair of disc substrates, each having a signal recording layer at a side thereof, by way of an intermediate layer that is an adhesive layer.

While the optical disc described in Patent Document 1 can provide an increased recording capacity because it is formed by bonding a pair of substantially flat disc substrates, it cannot satisfactorily contribute to downsizing the appliance that uses the optical disc as recording medium. In other words, a clamp mechanism or the like that holds an optical disc as described in Patent Document 1 at a surface thereof while the optical disc is mounted on a turn table at the opposite surface is required in order to support the optical disc on the disc rotary drive mechanism of a recording/reproduction apparatus so as to allow it to rotate integrally with the disc rotary drive mechanism. Then, it is difficult to reduce the thickness of the appliance.

SUMMARY OF THE INVENTION

In view of the above-identified circumstances, it is therefore an object of the present invention to provide an optical disc that is downsized and at the same time has an increased recording capacity and a disc cartridge containing such an optical disc.

Another object of the present invention is to provide an optical disc that can protect the information signal recording layer thereof and also the recorded information signals and a disc cartridge containing such an optical disc.

Still another object of the present invention is to provide an optical disc that can contribute to further downsizing and reducing the thickness of information processing apparatus such as personal computers, recording/reproduction apparatus such as optical disc players and video cameras and electric appliances such as television game machines and a disc cartridge containing such an optical disc.

Still another object of the present invention is to provide an optical disc that can highly precisely unify a first disc substrate and a second disc substrate that are bonded to each other, absorbing the machining errors of the disc substrates.

Still another object of the present invention is to provide an optical disc that can suppress any adverse effect on the signal recording surfaces formed on the disc substrates thereof and protect the signal recording surfaces when mounting it to and dismounting it from a rotary drive mechanism by magnetically attracting the clamping plate thereof from one of the surfaces.

Still another object of the present invention is to provide an optical disc that can be accurately aligned with and mounted on a rotary drive mechanism.

A further object of the present invention is to provide an optical disc that can reduce the thickness of the disc cartridge for containing the optical disc.

In an aspect of the present invention, the above objects and other objects of the invention are achieved by providing an optical disc for recording information signals, the optical disc comprising: a first disc substrate made of synthetic resin and provided with an information signal recording layer; and a second disc substrate made of synthetic resin and provided with an information signal recording layer, the first disc substrate having a raised section formed at the center of the substrate main body thereof and raised from one of the surfaces of the substrate main body with a first center hole bored through the center thereof, the front end surface of the raised section operating as reference surface when mounted on a rotary drive mechanism, and a plate receiving recess formed on the other surface of the substrate main body thereof in a region corresponding to the raised section and provided with a magnetically attractable clamping plate, the second disc substrate having a second center hole bored through the center thereof and a projecting section projecting from the second center hole toward the one of the surfaces of the substrate main body thereof. The second disc substrate is bonded to the other surface of the first disc substrate with the projecting section entering into the plate receiving recess of the first disc substrate. The projecting section arranged on the second disc substrate is so formed as to enter into the plate receiving recess, keeping a gap between the front end thereof and the plate receiving recess, at the time of bonding the second disc substrate to the first disc substrate. The clamping plate arranged in the plate receiving recess formed on the first disc substrate is supported by part of the projecting section arranged on the second disc substrate.

Preferably, the clamping plate is supported by a supporting projection that is adapted to project into the plate receiving recess by deforming part of the projecting section arranged on the second disc substrate by means of thermal deformation or some other deformation technique.

Preferably, in an optical disc according to the invention, a gap is formed between the outer peripheral surface of the projecting section and the inner peripheral surface of the plate receiving recess into which the projecting section enters in order to absorb an excessive part of an adhesive agent used for bonding the first disc substrate and the second disc substrate.

Preferably, the gap formed between the front end of the projecting section and the bottom surface of the plate receiving recess is adapted to absorb the error in the intermediate layer of the adhesive for bonding the first disc substrate and the second disc substrate.

Preferably, in an optical disc according to the invention, the projecting section is resiliently deformably linked to the second disc substrate.

Preferably, the clamping plate has a hollow raised section at a central part thereof and a flange section is formed at the base end side of the hollow raised section, the flange section being mounted on the bottom surface of the plate receiving recess, the flange section being arranged in the plate receiving recess and supported by the supporting projection produced by partly thermally deforming the projecting section so as to project into the plate receiving recess.

Preferably, the clamping plate is so formed as to show a height that does not make it project from the other surface of the second disc substrate having the one of the surfaces thereof bonded to the other surface of the first disc substrate. The hollow raised section of the clamping plate has an inner diameter greater than the inner diameter of the first center hole bored through the first disc substrate.

In another aspect of the present invention, there is provided a disc cartridge having a cartridge main body for containing an optical disc for recording information signals described above, the optical disc being rotatably contained in the cartridge main body with the raised section exposed to a driving aperture formed at one of the opposite sides of the cartridge main body, a rotary drive mechanism for driving the optical disc to rotate being at least partly exposed to the driving aperture.

Preferably, in a disc cartridge according to the invention, a recording/reproduction aperture is formed on at least one of the surfaces of the cartridge main body of the disc cartridge to expose the signal recording region of the optical disc contained in the cartridge main body to the outside from the inner periphery to the outer periphery thereof.

Preferably, a disc supporting section is arranged in the cartridge main body to support the non-signal-recording region of the optical disc that is arranged at the inner peripheral side of the optical disc contained in the cartridge main body.

DETAILED DESCRIPTION OF THE PREFERRED EMBODIMENTS

Now, an optical disc and a disc cartridge containing such an optical disc according to the invention will be described specifically by referring to the accompanying drawings.

Figure 1:
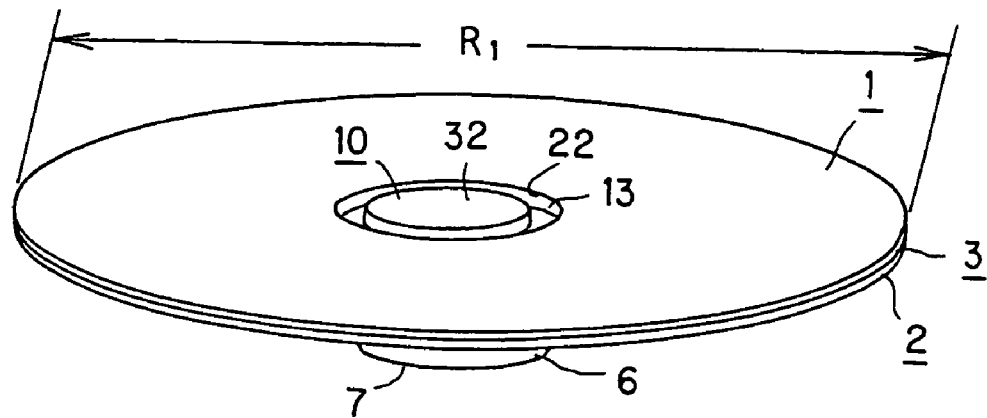
FIG. 1 is a schematic perspective view of an optical disc according to the invention.
Figure 2:
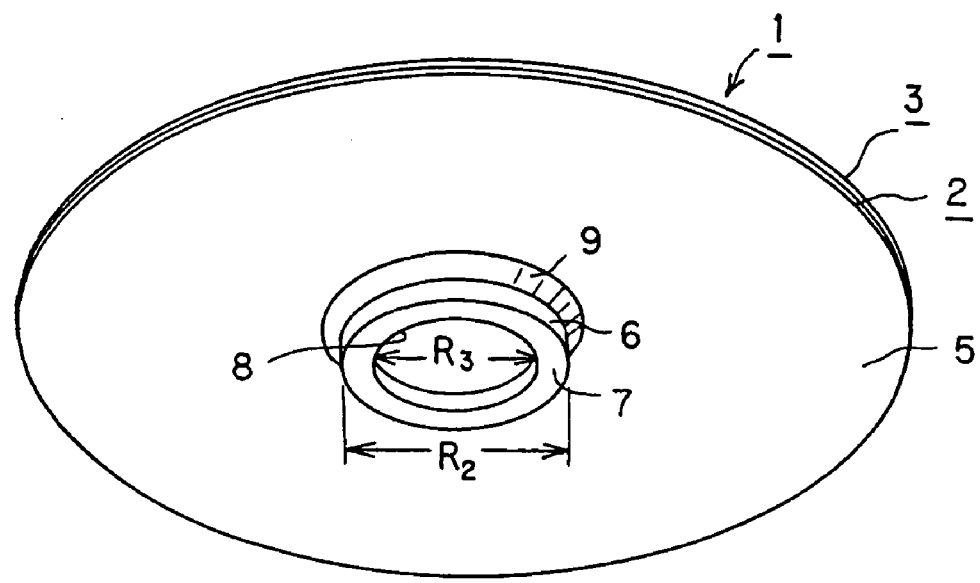
FIG. 2 is a schematic perspective view of an optical disc according to the invention as viewed from the lower surface side thereof where a raised section is formed.

Firstly, an optical disc 1 according to the invention will be described. As shown in FIGS. 1 and 2, an optical disc 1 according to the invention is formed by bonding a first disc substrate 2 and a second disc substrate 3. The first and second disc substrates 2, 3 are formed by molding a light-transmitting synthetic resin material. In this embodiment, the first and second disc substrates 2, 3 are made of transparent polycarbonate resin.

Figure 3:
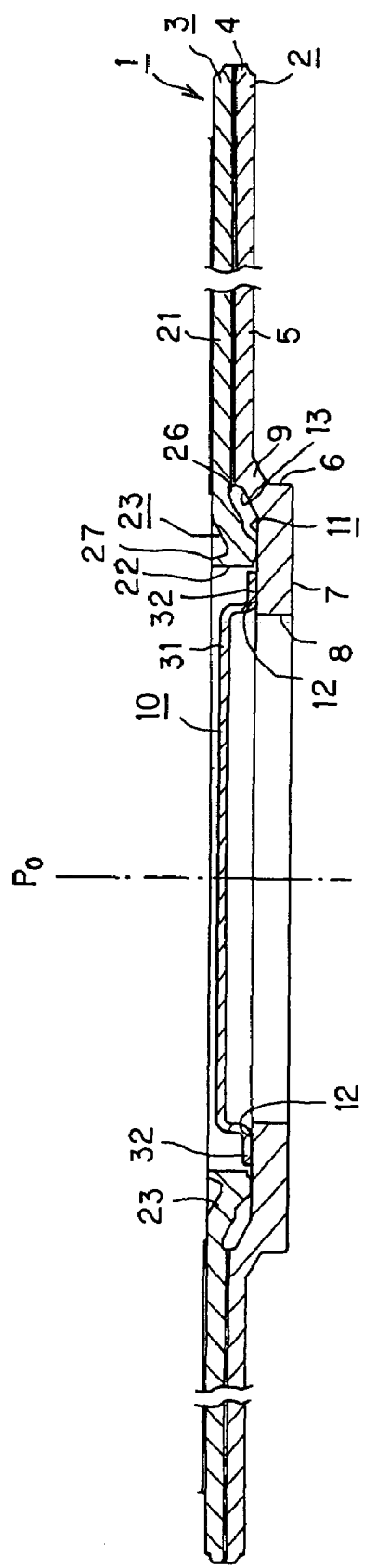
FIG. 3 is a schematic cross sectional view of an optical disc according to the invention.

As shown in FIG. 3, the first and second disc substrates 2, 3 are united by bonding each other by way of an intermediate layer 4 that is an adhesive layer. The intermediate layer 4 is made of transparent adhesive synthetic resin such as UV-setting type resin.

As shown in FIGS. 2 and 3, the first disc substrate 2 that is to be bonded to the second disc substrate 3 to form an optical disc 1 according to the invention includes a substrate main body 5 and a raised section 6 located at the center of the substrate main body 5 and raised from one of the surfaces of the disc main body 5. The raised section 6 has a cylindrical profile with its center agreeing with the center P0 of the substrate main body 5. The front end surface of the raised section 6 provides a mounting reference surface 7 when the optical disc 1 formed by using the first disc substrate 2 is mounted on a disc rotary drive mechanism. In other words, the optical disc 1 is mounted on a rotary drive mechanism as the mounting reference surface 7, which is the front end surface of the raised section 6, is placed on the disc receiving surface of the disc rotary drive mechanism, which is arranged in a recording/reproduction apparatus, and aligned in terms of altitude, or vertical direction. The disc receiving surface is formed by the turn table of the rotary drive mechanism.

A first center hole 8 is formed at the center of the raised section 6 that agrees with the center P0 of the substrate main body 5. The first center hole 8 operates as aligning section for aligning the optical disc 1 in terms of horizontal direction when the optical disc 1 is mounted on the disc rotary drive mechanism. When the optical disc 1 is mounted on the rotary drive mechanism, it is aligned in terms of horizontal direction as the centering section of the rotary drive mechanism that is formed in a central part of the rotary drive mechanism engages the first center hole 8 and the outer peripheral surface of the centering section abuts the inner peripheral surface of the first centering hole 8. As a result, the optical disc 1 is centered. In other words, the rotary center of the optical disc 1 becomes to agree with the rotary center of the rotary drive mechanism.

As shown in FIG. 3, the raised section 6 of this embodiment is linked to the substrate main body 5 by way of a link section 9 that is inclined relative to the substrate main body 5 and raised from the latter. The link section 9 is formed to operate as a resiliently deforming section for resiliently deforming the raised section 6 in the altitudinal direction of the disc substrate 2 when a load, which may be external force, trying to press down the raised section 6 is applied to the raised section 6 in order to exploit the properties of the synthetic resin of the first disc substrate 2. Therefore, the link section 9 is adapted to show a height smaller than that of the raised section 6 so that it may easily resiliently deformed when a load is applied to the raised section 6.

A plate receiving recess 11 is arranged on the other surface of the substrate main body 5 of the first disc substrate 2 to receive a clamping plate 10. The clamping plate 10 is adapted to be attracted by the magnet arranged in the rotary drive mechanism to hold the optical disc 1 to the rotary drive mechanism. As shown FIG. 3, the plate receiving recess 11 is formed within the area of the raised section 6 that is formed on the opposite surface of the substrate main body 5. The plate receiving recess 11 has a diameter greater than that of the first center hole 8 so as to surround the first center hole 8. The bottom surface of the plate receiving recess 11 operates as plate receiving surface 12 for receiving the clamping plate 10. The plate receiving surface 12 is formed as a flat surface so that the clamping plate 10 may be stably received there. The peripheral surface 13 of the plate receiving recess 11 is an inclined surface that corresponds to the inclined link section 9.

A first information signal receiving layer 14 is arranged on the other surface of the first disc substrate 2 that is to be bonded to the second disc substrate 3. Data such as audio data or video data or data of application software such as television games are recorded on the first information signal recording layer 14 as a pit pattern that is a pattern of continuous micro-undulations.

While this embodiment is a ROM type optical disc 1 carrying pre-recorded data, an optical disc 1 according to the invention may be adapted to record data on it. When an optical disc according to the invention is a recordable optical disc, the first information signal recording layer 14 is a recording layer adapted to optically record data on it.

As shown in FIGS. 1 and 3, the second disc substrate 3 that is to be bonded to the other surface of the first disc substrate 2 by way of the intermediate layer 4 has a second center hole 22 formed at a central part of the substrate main body 21 of the second disc substrate 3. The second disc substrate 3 has a projecting section 23 that projects at the side of one of the surfaces of the substrate main body 21. More specifically, the projecting section 23 has a ring-shaped profile that is inclined and projects from the peripheral edge of the second center hole 22 toward the one of the surfaces of the substrate main body 21.

Figure 4:
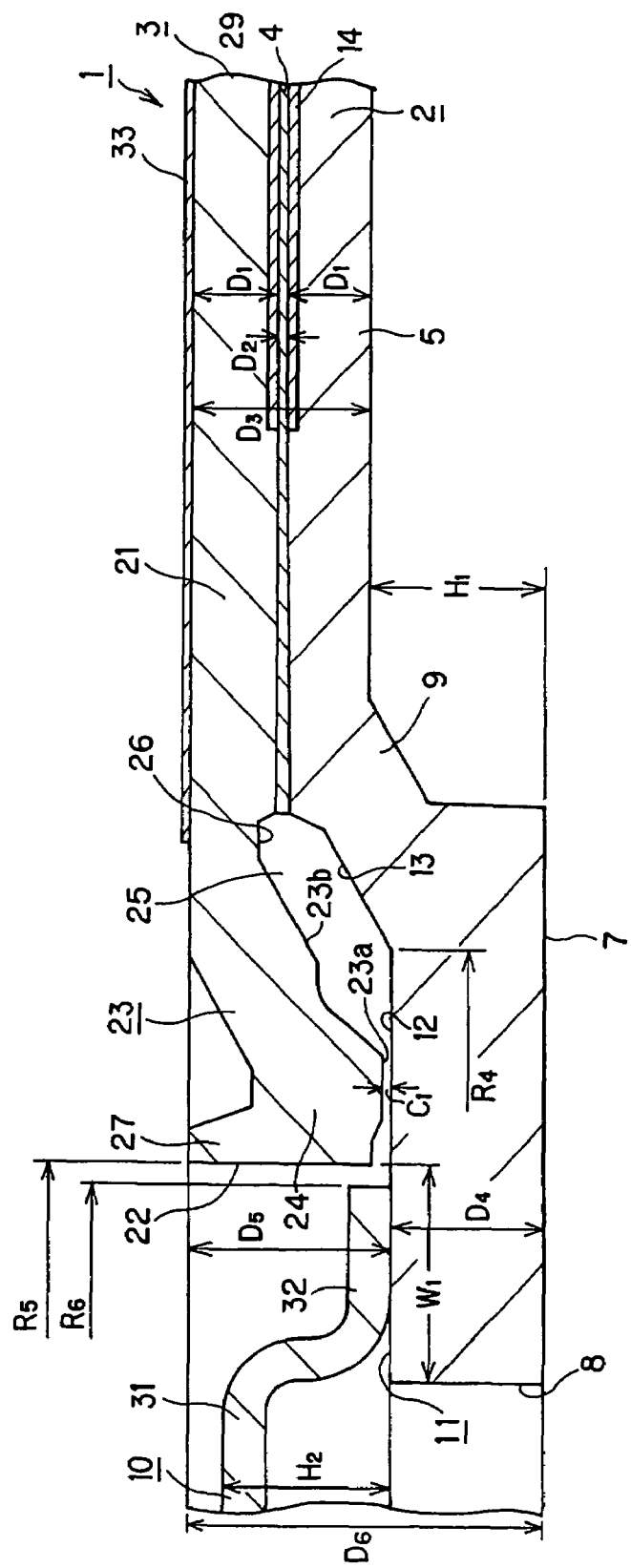
FIG. 4 is a schematic cross sectional view of an optical disc according to the invention, showing a principal part thereof.

As shown in FIG. 3, the projecting section 23 has a size adapted to enter the inside of the plate receiving recess 11 of the first disc substrate 2 when the second disc substrate 3 is bonded to the corresponding surface of the first disc substrate 2. As shown in FIG. 4, additionally, the projecting section 23 projects to such an extent that a certain gap C1 is maintained between a projecting surface 23a, which is the front end surface of the front end section 24 of the second disc substrate 3 projecting toward the corresponding surface of the first disc substrate 2, and the plate receiving surface 12, which is the bottom surface of the plate receiving recess 11, when it is entered into the inside of the plate receiving recess 11. The gap C1 operates to absorb any error in the thickness of the intermediate layer 4 and reliably bond the first disc substrate 2 and the second disc substrate 3. For example, the first and second disc substrates 2, 3 can be tightly brought into contact with each other and reliably bonded to each other to obtain an optical disc 1 if the intermediate layer 4 has a thickness smaller than the specified value.

As the gap C1 is maintained when the projecting section 23 is entered into the inside of the plate receiving recess 11, it absorbs the error in the depth of the plate receiving recess 11 and/or the error in the extent of projection of the projecting section 23 to be entered into the plate receiving recess 11 to make it possible to reliably bond the first and second disc substrates 2, 3 to each other by way of the intermediate layer 4 if the error is found within the tolerance.

Additionally as shown in FIGS. 3 and 4, the projecting section 23 is formed in such a way that a gap 25 is produced between the outer peripheral surface 23b thereof located at the side of the one of the surfaces of the substrate main body 21 and the peripheral surface 13 of the plate receiving recess 11 when the projecting section 23 is entered into the inside of the plate receiving recess 11. The gap 25 absorbs the excessive part of the adhesive agent of the intermediate layer 4 that bonds the first and second disc substrates 2, 3. As such a gap 25 is provided, the excessive part of the adhesive agent that is used to bond the first and second disc substrates 2, 3 is absorbed by the gap 25 so that the adhesive agent is prevented from leaking out to the side of the mounting reference surface 7 of the plate receiving recess 11 and leaking out to the side of the inner peripheral surface of the first center hole 8 and further to the side of the mounting reference surface 7, and a situation where the optical disc cannot be accurately mounted on the rotary drive mechanism due to the leaked adhesive agent is prevented from taking place.

Meanwhile, a recess 26b is formed at the link section side of the projecting section 23 that links the projecting section 23 to the substrate main body 21 to reduce the thickness of the link section. The recess 26 operates as resiliently displaceable section to exploit the properties feed-out the synthetic resin of the second disc substrate 3. In other words, when the projecting section 23 is subjected to a load such as external force trying to press down it, it is resiliently displaced around the recess 26 in the altitudinal direction of the second disc substrate 3.

Figure 5:
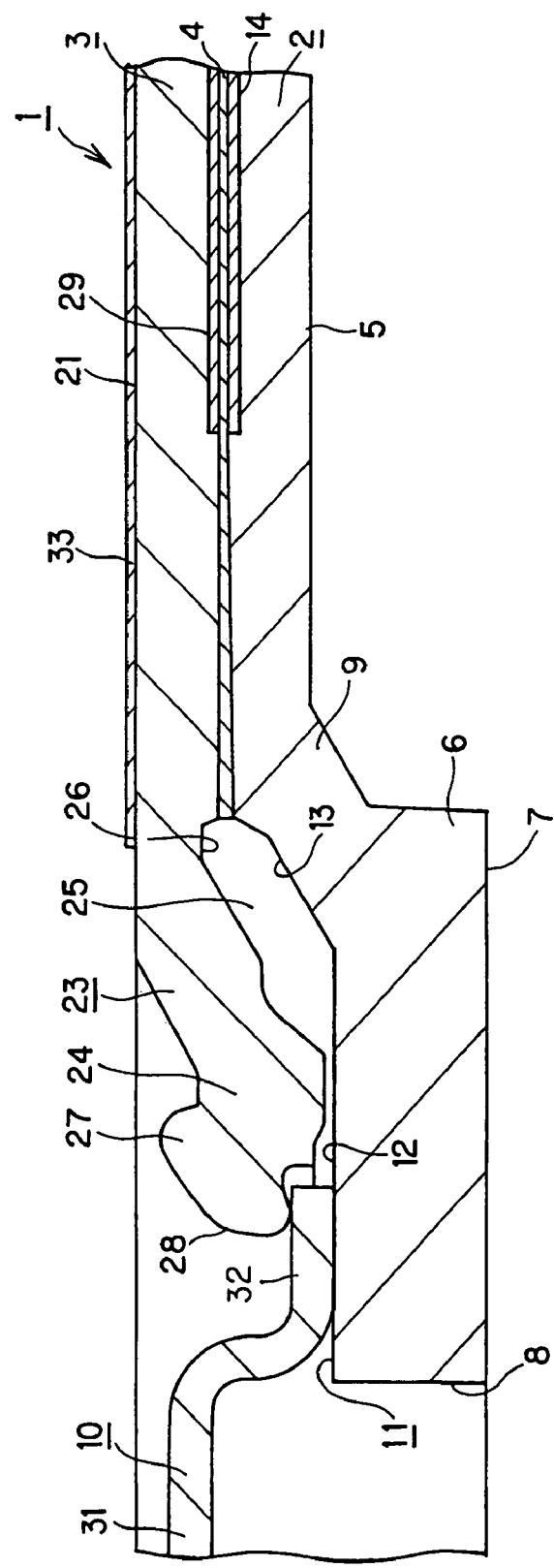
FIG. 5 is a schematic cross sectional view of an optical disc according to the invention in a state where the clamping plate is supported by the supporting projection and fitted to the plate receiving recess.

As shown in FIG. 3, a thermally deformable section 27 is formed at the front end section 24 of the projecting section 23. As shown in FIG. 5, the thermally deformable section 27 produces a supporting projection 28 for supporting the clamping plate 10 arranged in the plate receiving recess 11 as it is thermally deformed typically by means of an ultrasonic application apparatus.

A second information signal recording layer 29 is arranged on the one of the surfaces of the second disc substrate 3, which is to be bonded to the first disc substrate 2. As in the case of the first information signal recording layer 14 arranged on the first disc substrate 2, data such as audio data or video data or data of application software such as television games are recorded on the second information signal recording layer 29 as a pit pattern that is a pattern of continuous micro-undulations.

Since an optical disc 1 according to the invention may be adapted to record data on it, the second information signal recording layer 29 arranged on the second disc substrate 3 may be a recording layer adapted to optically record data on it.

Now, the clamping plate 10 that is used in an optical disc 1 according to the invention will be described below. An optical disc 1 according to the invention is adapted to be mounted on a rotary drive mechanism by means of magnetic attraction power. Thus, the clamping plate 10 is made of a magnetic material such as an iron type metal plate so that it may be attracted by the magnet arranged in the rotary drive mechanism. As shown in FIGS. 1 and 3, the clamping plate 10 has a hollow raised section 31 at the center thereof and a flange section 32 formed at the base end side of the hollow raised section 31. As shown in FIG. 3, the clamping plate 10 is arranged in the plate receiving recess 11 as its flange section 32 is received on the plate receiving surface 12.

As shown in FIG. 5, the clamping plate 10 is fitted to the inside of the plate receiving recess 11 as the flange section 32 is supported by the supporting projection 28 that is produced by thermally deforming the thermally deformable section 27 arranged at the front end section 24 of the projecting section 23.

Meanwhile, the clamping plate 10 that is arranged in the plate receiving recess 11 is adapted to show such a height that it does not project from the other surface of the second disc substrate 3 that is bonded to the corresponding other surface of the first disc substrate 2 when it is placed in the plate receiving recess 11. Thus, the thickness of the optical disc 1 not increased as a result of arranging a clamping plate 10 when it is formed to show such a height.

The hollow raised section 31 formed in the clamping plate 10 has an inner diameter greater than the inner diameter of the first center hole 8 of the first disc substrate 2. With this arrangement, the optical disc 1 is accurately centered when the centering section of the rotary drive mechanism is brought into engagement with the first center hole 10 because the clamping plate 10 does not abut the centering section to interfere with an accurate centering operation.

The second center hole 22 bored through the second disc substrate 3 is so dimensioned as to smoothly contain the clamping plate 10.

Now, the manufacturing process of an optical disc 1 according to the invention and having the above-described configuration will be described below.

When manufacturing an optical disc 1 according to the invention, firstly a first disc substrate 2 carrying a first information signal recording layer 14 and the second disc substrate 3 carrying a second information signal recording layer 29 are brought in.

Then, bonding synthetic resin, which may typically be UV-setting type resin, is applied to the other surface of the first disc substrate 2 where the first information signal recording layer 14 is formed to produce an intermediate layer 4. UV-setting type resin is applied uniformly to the other surface of the first disc substrate 2 typically by means of the spin coat technique.

Then, the second disc substrate 3 is bonded onto the other surface of the first disc substrate 2 where UV-setting type resin is applied. At this time, the center of the second disc substrate 3 is aligned with the center P0 of the first disc substrate 2 and the projecting section 23 is entered into the plate receiving recess 11 to bond the second disc substrate 3 onto the first disc substrate 2 as shown in FIG. 3.

The first and second disc substrates 2, 3 are bonded by irradiating UV rays from the light transmitting first disc substrate 2 or from the light transmitting second disc substrate 3 to set the UV-setting type resin of the intermediate layer 4.

After bonding the first and second disc substrates 2, 3, the clamping plate 10 is arranged in the plate receiving recess 11. More specifically, the clamping plate 10 is arranged in the plate receiving recess 11 by way of the second center hole 22. At this time, the clamping plate 10 is arranged in place by placing the flange section 32 thereof on the plate receiving surface 12, allowing the hollow raised section 31 to project toward the second disc substrate 3 as shown in FIG. 3. The clamping plate 10 is arranged in place by aligning the center thereof with the center P0 of the first disc substrate 2.

Then, an ultrasonic wave is applied to the thermally deformable section 27 from an ultrasonic welding apparatus to produce a thermally deformable supporting projection 28 on the flange section 32 so as to support the flange section 32 by means of the supporting projection 28 as shown in FIG. 5. The clamping plate 10 maintains its state of being placed in the plate receiving recess 11 as the flange section 32 is supported by the supporting projection 28.

Thus, an optical disc 1 according to the invention is obtained by bonding the first and second disc substrates 2, 3 and placing and supporting the clamping plate 10 in the plate receiving recess 11 in the above described manner.

A printing layer 33 is formed on the other surface of the second disc substrate 3 that is bonded to the first disc substrate 2. Characters and graphics are printed on the printing layer 33 to display the contents of the information signals and the titles of the contents recorded in the first and second information signal recording layers 14, 29. The printing layer 33 may be formed before bonding the second disc substrate 3 to the first disc substrate 2.

While the supporting projection 28 is formed by partly thermally deforming the projecting section 23 and the clamping plate 10 is supported by the supporting projection 28 in the above-described embodiment, the supporting projection 28 may be formed by way of a deforming process that employs a technique other than thermal deformation.

It is sufficient for the clamping plate 10 to be partly supported by the projecting section 23 arranged on the second disc substrate 3. The supporting projection 28 may be formed on the supporting projection 23 in advance and made to support the clamping plate 10 arranged in the plate receiving recess 11 when the second disc substrate 3 is bonded to the first disc substrate 2.

Figure 6:
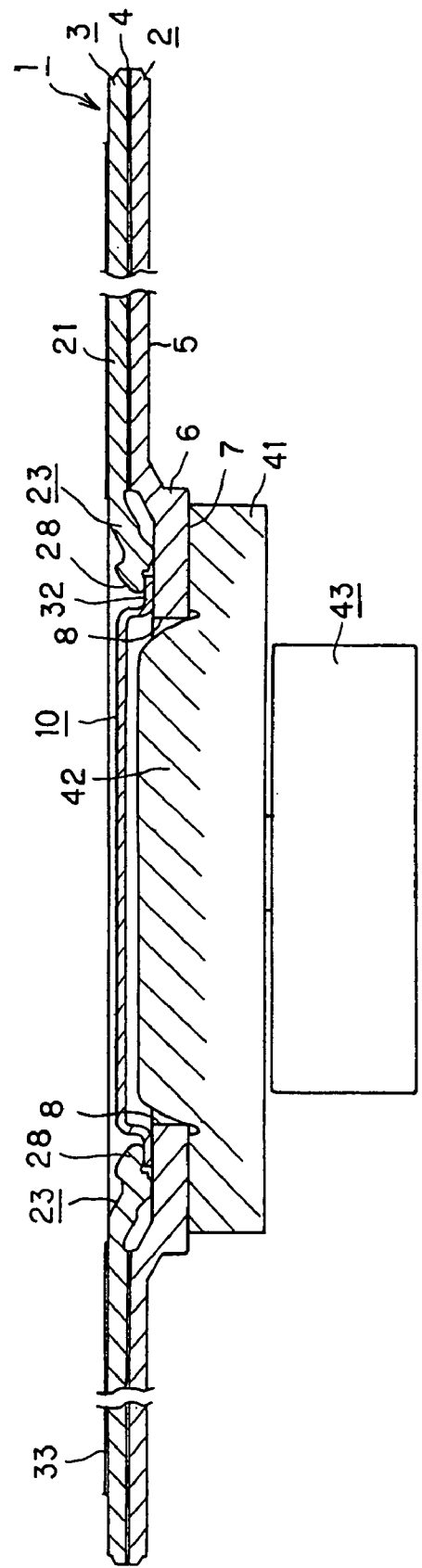
FIG. 6 is a schematic cross sectional view of an optical disc according to the invention mounted on a rotary drive mechanism.

As shown in FIG. 6, an optical disc 1 according to the invention and formed in a manner as described above is then mounted on a rotary drive mechanism 43 having a turn table 41 and a centering section 42 and driven to rotate. More specifically, the mounting reference surface 7 at the front end of the raised section 5 of the optical disc 1 is mounted on the turn table 41 and the centering section 42 is brought into engagement with the first center hole 10 to mount the optical disc 1 on the rotary drive mechanism 43. At this time, the clamping plate 10 of the optical disc 1 is attracted by the magnet (not shown) arranged in the turn table 41 so that the optical disc 1 is turned integrally with the turn table 41.

Then, the information signals recorded in the first and second information signal recording layers 14, 29 of the optical disc 1 are read out as the light beam emitted from the optical head is irradiated onto the one of the surfaces of the first disc substrate 2 and return light reflected by the first or second information signal recording layers 14, 29 is detected by the optical head.

Meanwhile, the clamping plate 10 arranged on an optical disc 1 according to the invention is supported by the supporting projection 26 and fitted to the inside of the plate receiving recess 11 without using any bonding means such as adhesive agent so that there is no risk that the clamping plate 10 falls from the inside of the plate receiving recess 11, although such a risk may arise when an adhesive agent is used to form a bonding section and the bonding section comes off. Particularly, the clamping plate 10 of the optical disc 1 of the above described embodiment is placed on the plate receiving surface 12 of the raised section 6 that is resiliently deformable in the altitudinal direction of the first disc substrate 2 and supported by the supporting projection 28 arranged on the projecting section 23 that is resiliently deformable in the altitudinal direction of the second disc substrate 3. Thus, if the raised section 6 and the projecting section 23 are resiliently deformed, they resiliently restore their original postures so that clamping plate 10 becomes supported once again by the supporting projection 28 to recover the state where the clamping plate 10 is supported in the inside of the plate receiving recess 11. This state will be described in greater detail below.

Figure 7:
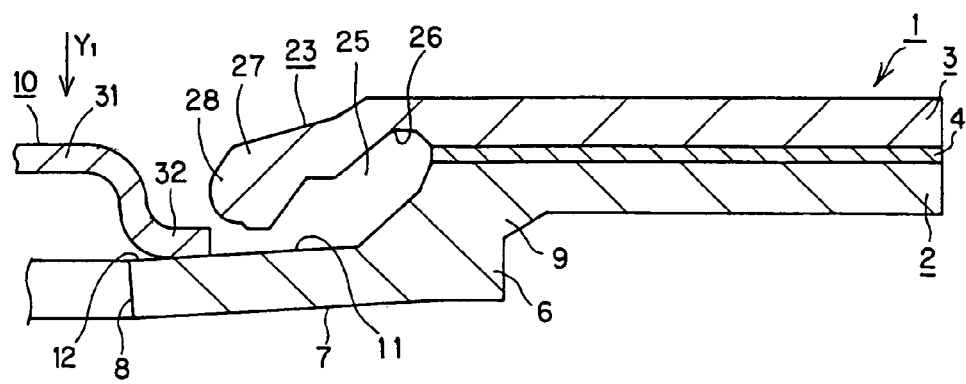
FIG. 7 is a schematic cross sectional view of an optical disc according to the invention in a state where a load is applied thereto to push down the clamping plate toward the side of the raised section.

As force is applied to the clamping plate 10 of an optical disc 1 according to the invention so as to press it toward the plate receiving surface 12 in the direction of arrow Y1 in FIG. 7, the raised section 6 is resiliently deformed in the direction of arrow Y1 in FIG. 7 using the link section 9 as resiliently deformed section. As a result, the clamping plate 10 is separated from the supporting projection 28 as shown in FIG. 7 so that the supporting projection 28 no longer presses and supports the plate receiving surface 12. However, as the force pressing the plate receiving surface 12 in the direction of arrow Y1 in FIG. 7 is removed, the raised section 6 turns in the direction opposite to arrow Y1 and resiliently restores the original posture so that the clamping plate 10 is once again pressed by the supporting projection 28 toward the side of the plate receiving surface 12 and supported by the supporting projection 28.

Figure 8:
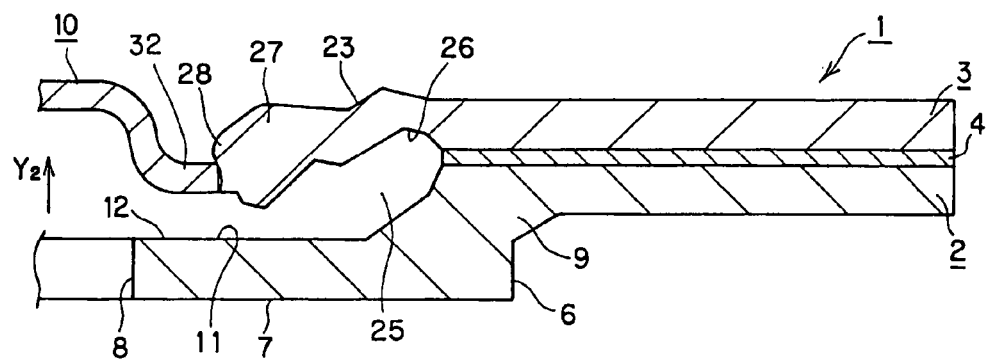
FIG. 8 is a schematic cross sectional view of an optical disc according to the invention in a state where a load is applied thereto to push up the clamping plate toward the side of the projecting section.

On the other hand, as force is applied to the clamping plate 10 so as to press it toward the projecting section 23 in the direction of arrow Y2 in FIG. 8, the projection section 23 is resiliently deformed in the direction of arrow Y2 in FIG. 8 using the part thereof where the recess 26 is formed as resiliently deformed section. As a result, as shown in FIG. 8, the clamping plate 10 is separated from the plate receiving surface 12 so that the supporting projection 28 no longer presses and supports the plate receiving surface 12. However, as the force pressing the plate receiving surface 12 in the direction of arrow Y2 in FIG. 8, the projecting section 23 turns in the direction opposite to arrow Y2 and resiliently restores the original posture so that the clamping plate 10 is once again pressed by the supporting projection 28 toward the side of the plate receiving surface 12 and supported by the supporting projection 28.

Additionally, when a load is applied to the clamping plate 10 of an optical disc 1 according to the invention, the raised section 6 where the plate receiving surface 12 is arranged to support the clamping plate 10 and the projecting section 23 where the supporting projection 28 is arranged are resiliently deformed to prevent the load from being transmitted to the sides of the substrate main bodies 5, 21 where the first and second information signal recording layers 14, 29 are arranged respectively. Thus, the first and second information signal recording layers 14, 29 where information signals are recorded and hence the recorded information signals are reliably protected.

Meanwhile, an optical disc 1 according to the invention is adapted to raise the recording capacity of the first and second information signal recording layers 14, 29 and also to be downsized. More specifically, an optical disc 1 according to the invention has a diameter of R1, which is equal to 60 mm, as shown in FIG. 1 and is formed by using first and second disc substrates 2, 3 having a thickness of D1, which is equal to 0.4 mm, and an intermediate layer 4 for bonding the first and second disc substrates 2, 3 having a thickness of D2, which is equal to 0.04 mm, to make the overall thickness D3 equal to 0.84 mm except the printing layer 33 as shown in FIG. 4. The raised section 6 that is raised from the one of the surfaces of the first disc substrate 2 and includes the link section 9 has a height H1, which is equal to 0.82 mm as measured from the one of the surfaces of the first disc substrate 2. As shown in FIG. 2, the raised section 6 is made to show a cylindrical profile with a diameter R2 of 16.4 mm. The first center hole 8 formed in a central part of the raised section 6 has a diameter R3 of 11 mm.

The part of the raised section 6 where the plate receiving surface 12 is formed has a thickness D4 of 0.72 mm. On the basis of the thickness D4 of the part of the raised section 6 where the plate receiving surface 12 is formed and the projecting height H1 of the raised section 6, the plate receiving recess 11 is made to show a depth of 0.5 mm and the depth D5 from the plate receiving surface 12 to the other surface of the second disc substrate 3 is made equal to 0.94 mm.

The flat bottom surface of the plate receiving recess 11 that operates as plate receiving surface 12 has a diameter R4 of 15 mm.

The second center hole 22 bored through the second disc substrate 3 has a diameter R5 of 13 mm before the thermally deformable section 27 is actually thermally deformed.

Due to the dimensional relationship between the first center hole 8 and the second center hole 22, the plate receiving surface 12 is exposed to the second center hole 22 by a width W1 of 2 mm.

The clamping plate 10 arranged on the plate receiving surface 12 by way of the flange section 32 has a diameter R6 of 12.8 mm. The clamping plate 10 is formed to show a height H2 that is smaller than the depth D5 from the plate receiving surface 12 to the other surface of the second disc substrate 3 so that it may not project from the other surface of the second disc substrate 3 when it is arranged in the plate receiving recess 11.

The thickness D6 of an optical disc 1 according to the invention as measured from the mounting reference surface 7 located at the front end of the raised section 6 to the other surface of the second disc substrate 3 is 1.66 mm.

Meanwhile, an optical disc 1 according to the invention is adapted to raise the recording capacity of the first and second information signal recording layers 14, 29 and also to be downsized. More specifically, an optical disc 1 according to the invention has a diameter of R1, which is not greater than 64 mm, more specifically equal to 60 mm, as shown in FIG. 1. The fist and second disc substrates 2, 3 of the optical disc 1 has a thickness D1 that is not smaller than 0.3 mm and not greater than 0.6 mm, more specifically equal to 0.4 mm, in the areas thereof where the first and second information signal recording layers 14, 29 are arranged respectively. The intermediate layer 4 that bonds the first and second disc substrates 2, 3 has a thickness D2 of about 0.04 mm. Thus, the overall thickness D3 of an optical disc 1 according to the invention is between 1.24 mm and 0.64 mm except the printing layer 33.

The raised section 6 that is raised from the one of the surfaces of the first disc substrate 2 and includes the link section 9 has a height H1, which is about 0.8 mm as measured from the one of the surfaces of the first disc substrate 2. As shown in FIG. 2, the raised section 6 is made to show a cylindrical profile with a diameter R2 of about 16.4 mm. The first center hole 8 formed in a central part of the raised section 6 has a diameter R3 of about 11 mm.

More specifically, the part of the raised section 6 where the plate receiving surface 12 is formed has a thickness D4 of about 0.72 mm. On the basis of the thickness D4 of the part of the raised section 6 where the plate receiving surface 12 is formed and the projecting height H1 of the raised section 6, the plate receiving recess 11 is made to show a depth of about 0.5 mm and the depth D5 from the plate receiving surface 12 to the other surface of the second disc substrate 3 is made equal to 0.94 mm. The flat bottom surface of the plate receiving recess 11 that operates as plate receiving surface 12 has a diameter R4 of 15 mm.

The second center hole 22 bored through the second disc substrate 3 has a diameter R5 of 13 mm before the thermally deformable section 27 is actually thermally deformed.

Due to the dimensional relationship between the first center hole 8 and the second center hole 22, the plate receiving surface 12 is exposed to the second center hole 22 by a width W1 of 2 mm.

The clamping plate 10 arranged on the plate receiving surface 12 by way of the flange section 32 has a diameter R6 of 12.8 mm. The clamping plate 10 is formed to show a height H2 that is smaller than the depth D5 from the plate receiving surface 12 to the other surface of the second disc substrate 3 so that it may not project from the other surface of the second disc substrate 3 when it is arranged in the plate receiving recess 11.

The thickness D6 of an optical disc 1 according to the invention as measured from the mounting reference surface 7 located at the front end of the raised section 6 to the other surface of the second disc substrate 3 is 1.66 mm.

The gap C1 produced between the projecting surface 23a of the projecting section 23 of the second disc substrate 3 and the plate receiving surface 12 that is the bottom surface of the plate receiving recess 11 is not greater than 0.1 mm.

Figure 9:
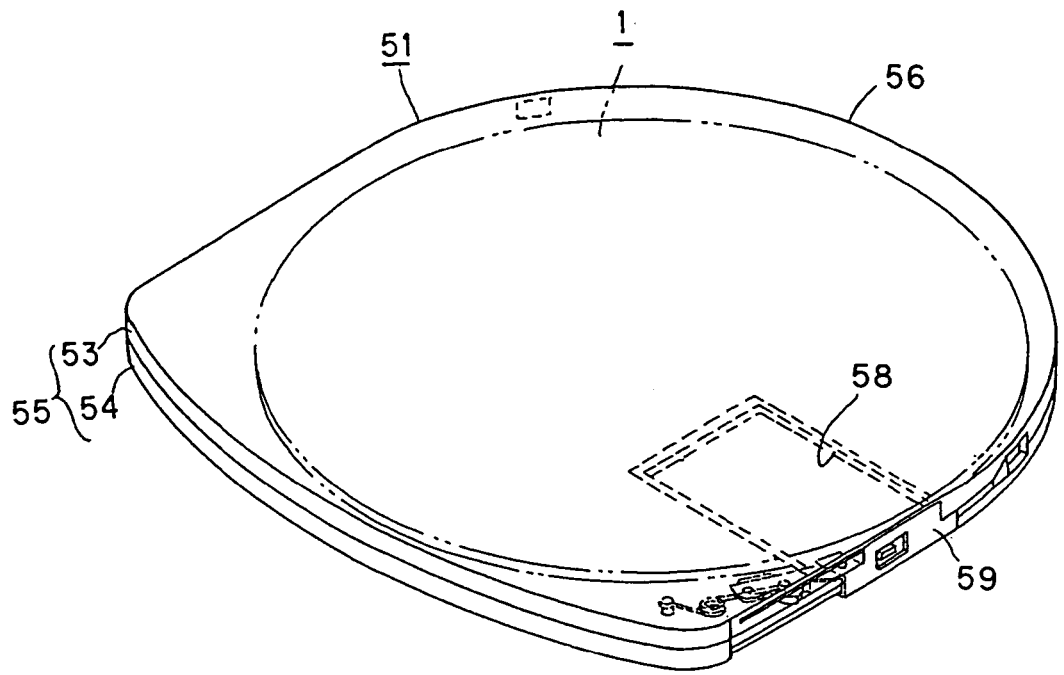
FIG. 9 is a schematic perspective view of a disc cartridge according to the invention and containing an optical disc as viewed from the side of the upper half thereof.
Figure 10:
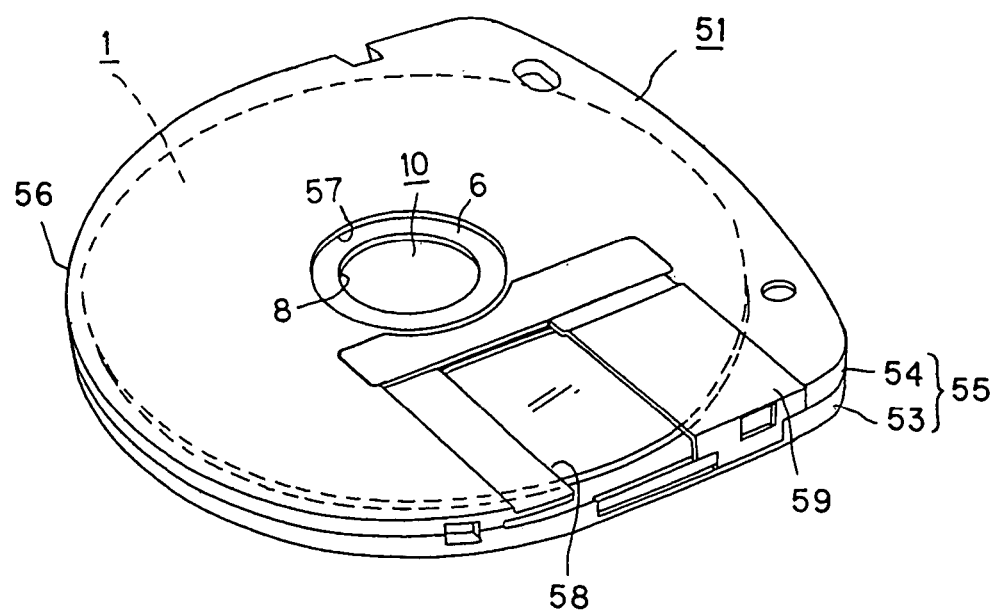
FIG. 10 is a schematic perspective view of a disc cartridge according to the invention as viewed from the side of the lower half thereof.

Then, an optical disc 1 according to the invention having the above described configuration is contained in a cartridge main body 55 that is formed by combining and binding a pair of an upper half and a lower half 53, 54 to produce a disc cartridge 51 according to the invention as shown in FIGS. 9 and 10.

As shown in FIGS. 9 and 10, the cartridge main body 55 containing an optical disc 1 according to the invention has an arc-shaped section 56 at the front end side thereof, which operates as the leading side of the disc cartridge 51 when the disc cartridge 51 is inserted into and taken out from a disc recording/reproduction apparatus. With this arrangement, the disc cartridge 51 is further downsized to make itself match the downsized optical disc 1 that is contained in it.

The cartridge main body 55 is provided at a central part of the lower half 54, which produces one of surfaces, or the lower surface, of the cartridge main body 55, with a circular driving aperture 57 that is exposed to the turn table that is part of the rotary drive mechanism arranged at the side of the disc recording/reproduction apparatus, into which the disc cartridge 51 is inserted. Additionally, the cartridge main body 55 is provided on the lower surface thereof with an aperture 58 for the optical head of the disc recording/reproduction apparatus that exposes the signal recording region of the optical disc 1 contained in the cartridge main body 55 to the outside from the inner periphery to the outer periphery thereof for the purpose of signal recording/reproduction. The aperture 58 for the optical head is located at a lateral side of the cartridge main body 55 that is perpendicular to the front side thereof where the arc-shaped section 56 is arranged and shows a rectangular contour extending from a position close to the driving aperture 57 to the lateral side. In other words, the aperture 58 for the optical head is rectangular and has a size sufficient large for exposing part of the signal recording region of the optical disc 1 contained in the cartridge main body 55 from the inner periphery to the outer periphery thereof.

The information signals recorded on an optical disc 1 according to the invention are reproduced or information signals are recorded on the optical disc 1 as a light beam is irradiated onto it from the side of one of the surfaces thereof. Thus, the cartridge main body 55 is provided with an aperture 58 for the optical head only at the side of the lower half 54 thereof and hence no aperture is formed at the side of the upper half 53. In other words, the upper half 53 simply shows a flat surface.

A shutter member 59 for opening and closing the aperture 58 for the optical head is fitted to the cartridge main body 55. The shutter member 59 is moved and held to the position for closing the aperture 58 when the disc cartridge 51 is not inserted into a recording/reproduction apparatus and hence not in use to protect the optical disc 1 contained in the cartridge main body 55.

Figure 11:
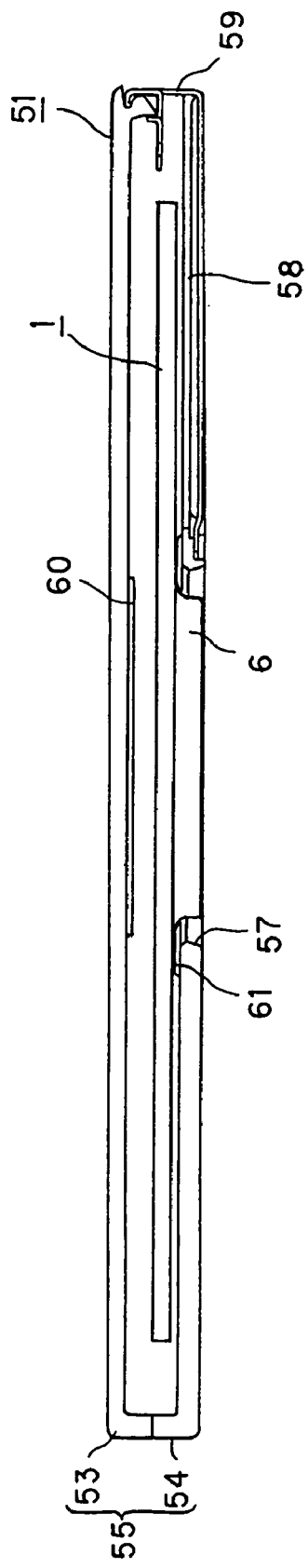
FIG. 11 is a schematic cross sectional view of a disc cartridge according to the invention showing a state of containing an optical disc.

As shown in FIGS. 10 and 11, an optical disc 1 according to the invention is rotatably contained in the cartridge main body 55 with the raised section 6 exposed to the driving aperture 57.

Additionally, the cartridge main body 55 is provided with disc supporting sections 60, 61 for supporting the optical disc 1 contained in the cartridge main body 55 at the non-signal-recording region arranged at the inner peripheral side of the optical disc 1. As shown in FIG. 11, the disc supporting sections 60, 61 are arranged respectively on the inner surfaces of the upper and lower halves 53, 54.

As shown in FIG. 11, the optical disc 1 contained in the cartridge main body 55 is located at the side of the lower half 54 with the raised section 6 exposed to the driving aperture 57 when it is not mounted on a rotary drive mechanism. Since the optical disc 1 is supported by the disc supporting section 61 arranged in the lower half 54 at the non-signal-recording region thereof arranged at the inner peripheral side thereof in this state, the signal recording region is prevented from contacting the inner surface of the cartridge main body 55. When, on the other hand, the optical disc 1 is pushed up to the side of the upper half 53, the optical disc 1 is supported by the disc supporting section 60 arranged in the upper half 53 at the non-signal-recording region thereof arranged at the inner peripheral side thereof so that the signal recording region is prevented from contacting the inner surface of the cartridge main body 55. In other words, the optical disc 1 is supported by the disc supporting section 60 or 61 at the non-signal-recording region thereof when it is moved upward or downward, whichever appropriate, in the cartridge main body 55 so that the signal recording region is prevented from contacting the inner surface of the cartridge main body 55. Thus, at least the signal recording region of the optical disc 1 is prevented from being damaged and hence the recorded information signals are protected.

Meanwhile, a disc cartridge 51 containing an optical disc 1 according to the invention reduces the distance by which it is moved to mount the optical disc 1 into and remove the optical disc 1 from a rotary drive mechanism if compared with a disc cartridge containing a conventional optical disc 1 having a uniform thickness.

More specifically, an optical disc 1 according to the invention is provided with a raised section 6 and the raised section 6 can be entered into the driving aperture 57 arranged in the cartridge main body 55. As a result, as described above by referring to FIG. 6, the raised section 6 is supported on the turn table 41 and, when removing the optical disc 1 that is mounted on the rotary drive mechanism 43 with the first center hole 8 of the raised section 6 engaged with the centering section 42 from the rotary drive mechanism 43, it is only necessary to move the disc cartridge 51 upward by the distance necessary for releasing the raised section 6 from the turn table 41. Since the raised section 6 is in a state of being entered into the driving aperture 57 at this time, the distance by which the disc cartridge 51 has to be moved is reduced if compared with a disc cartridge containing a conventional optical disc that does not have a raised section 6.

Thus, the height of the recording/reproduction apparatus or the like that is to be used with an optical disc 1 according to the invention can be reduced when it is used with a disc cartridge 51 containing an optical disc 1 according to the invention.

An optical disc 1 according to the invention may be contained in a disc cartridge having an arc-shaped section 56 as described above or alternatively in a disc cartridge having a rectangular profile.

While the present invention is applied to a reproduction-only type optical disc 1 in the above description, the present invention is equally applicable to a recording/reproduction type optical disc 1 when both or either of the first and second information signal recording layers 14, 29 is used as recording layer that can record information signals.

Since an optical disc according to the invention is formed by bonding first and second disc substrates, each having a signal recording layer, it can be made to have a large recording capacity.

Additionally, in an optical disc according to the invention, the first disc that is bonded to a second disc substrate is provided on one of the surfaces thereof with a raised section whose top surface operates as mounting reference surface when the optical disc is mounted in a rotary drive mechanism and the optical disc is adapted to be contained in cartridge main body with the raised section exposed to the rotary drive mechanism through the driving aperture of the cartridge main body. Since the optical disc is contained in a cartridge main body with the raised section exposed to the rotary drive mechanism, the amount of movement of the disc cartridge necessary for removing the optical disc from the rotary drive mechanism is minimized. In other words, if compared with a disc cartridge containing a flat optical disc, a disc cartridge containing an optical disc according to the invention can reduce the amount of movement necessary for removing the optical disc from the corresponding rotary drive main body by the height of the raised section that is exposed through the driving aperture and projects into the aperture. Thus, it is possible to make an electric appliance adapted to use a disc cartridge containing an optical disc according to the invention as recording medium very thin.

Still additionally, in an optical disc according to the invention, the clamping plate that is arranged in the plate receiving recess formed in the first disc substrate thereof is supported by a projecting section that is entered into the plate receiving recess arranged in the second disc substrate, thermally deforming part the of projecting section. Thus, the clamping plate can be fitted without using an adhesive agent so that an optical disc according to the invention is free from the problem that the excessive adhesive agent leaks out to the peripheral edges of the center holes and the front surface of the raised section to prevent the optical disc from being properly mounted on the rotary drive mechanism.

Still additionally, in an optical disc according to the invention, since a gap is provided between the front end of the raised section and the bottom surface of the plate receiving recess in order to above any excessive part of the adhesive agent used to bond the first and second disc substrates, an optical disc according to the invention is free from the problem that the excessive adhesive agent leaks out to the peripheral edges of the center holes and the front surface of the raised section to prevent the optical disc from being properly mounted on the rotary drive mechanism.

Still additionally, in an optical disc according to the invention, the projecting section arranged on the second disc substrate is adapted to enter into the plate receiving recess, maintaining the gap between the front end and the bottom surface of the plate receiving recess, when the second disc substrate is bonded to the first disc substrate. Thus, it is possible to absorb any error in the thickness of the intermediate layer of the adhesive agent that is used to bond the first and second substrates together and also any error in the thickness of the first disc substrate and the second disc substrate that are to be bonded to each other. Therefore, it is possible to reliably and highly accurately bond the first and second substrate.

Furthermore, in an optical disc according to the invention, the clamping plate is arranged in the plate receiving recess formed in the first disc substrate and supported by part of the projection arranged on the second disc substrate without being bonded to the latter. In other words, when force is applied to the clamping plate, trying to press it toward the fist disc substrate, the raised section is resiliently deformed to absorb the force. On the other hand, when force is applied to the clamping plate, trying to press it toward the second disc substrate, the projecting section is resiliently deformed to absorb the force. Thus, the substrate main body where signal recording layers are formed are exempted from being adversely affected by the deformation so that the optical disc is protected against damages.

Finally, in an optical disc according to the invention, the recessed and raised section of the clamping plate arranged at a central part thereof has an inner diameter greater than the inner diameter of the first center hole of the first disc substrate. Thus, it is possible to accurately place the optical disc in position when it is horizontally aligned by bringing the centering section of a rotary drive mechanism into engagement with the first center hole with use of the first center hole of the first disc substrate.

What is claimed is:

1. An optical disc for recording information signals, the optical disc comprising:
   a first disc substrate made of synthetic resin and provided with an information signal recording layer; and
   a second disc substrate made of synthetic resin and provided with an information signal recording layer;
   the first disc substrate having a raised section formed at the center of the substrate main body thereof and raised from one of the surfaces of the substrate main body with a first center hole bored through the center thereof, the front end surface of the raised section operating as reference surface when mounted on a rotary drive mechanism, and a plate receiving recess formed on the other surface of the substrate main body thereof in a region corresponding to the raised section and provided with a magnetically attractable clamping plate;

the second disc substrate having a second center hole bored through the center thereof and a projecting section projecting from the second center hole toward the one of the surfaces of the substrate main body thereof;

the second disc substrate being bonded to the other surface of the first disc substrate with the projecting section entering into the plate receiving recess of the first disc substrate;

the projecting section arranged on the second disc substrate being so formed as to enter into the plate receiving recess, keeping a gap between the front end thereof and the plate receiving recess, at the time of bonding the second disc substrate to the first disc substrate; and the clamping plate arranged in the plate receiving recess formed on the first disc substrate being supported by the projecting section arranged on the second disc substrate.

2. The optical disc according to claim 1, wherein the clamping plate is supported by a supporting projection that is adapted to project into the plate receiving recess by deforming part of the projecting section arranged on the second disc substrate.

3. The optical disc according to claim 1, wherein a gap is formed between the outer peripheral surface of the projecting section and the inner peripheral surface of the plate receiving recess into which the projecting section enters in order to absorb an excessive part of an adhesive agent used for bonding the first disc substrate and the second disc substrate.

4. The optical disc according to claim 1, wherein the gap formed between the front end of the projecting section and the bottom surface of the plate receiving recess is adapted to absorb the error in the intermediate layer of the adhesive for bonding the first disc substrate and the second disc substrate.

5. The optical disc according to claim 1, wherein the projecting section is resiliently deformably linked to the second disc substrate.

6. The optical disc according to claim 1, wherein the clamping plate has a hollow raised section at a central part thereof and a flange section is formed at the base end side of the hollow raised section, the flange section being mounted on the bottom surface of the plate receiving recess, the flange section being arranged in the plate receiving recess and supported by the supporting projection produced by partly thermally deforming the projecting section so as to project into the plate receiving recess.

7. The optical disc according to claim 6, wherein the clamping plate is so formed as to show a height that does not make it project from the other surface of the second disc substrate having the one of the surfaces thereof bonded to the other surface of the first disc substrate.

8. The optical disc according to claim 6, wherein the hollow raised section of the clamping plate has an inner diameter greater than the inner diameter of the first center hole bored through the first disc substrate.

9. A disc cartridge comprising:

an optical disc for recording information signals, the optical disc including:

a first disc substrate made of synthetic resin and provided with an information signal recording layer; and a second disc substrate made of synthetic resin and provided with an information signal recording layer;

the first disc substrate having a raised section formed at the center of the substrate main body thereof and raised from one of the surfaces of the substrate main body with a first center hole bored through the center thereof, the front end surface of the raised section operating as reference surface when mounted on a rotary drive mechanism, and a plate receiving recess formed on the other surface of the substrate main body thereof in a region corresponding to the raised section and provided with a magnetically attractable clamping plate;

the second disc substrate having a second center hole bored through the center thereof and a projecting section projecting from the second center hole toward the one of the surfaces of the substrate main body thereof;

the second disc substrate being bonded to the other surface of the first disc substrate with the projecting section entering into the plate receiving recess of the first disc substrate;

the projecting section arranged on the second disc substrate being so formed as to enter into the plate receiving recess, keeping a gap between the front end thereof and the plate receiving recess, at the time of bonding the second disc substrate to the first disc substrate;

the clamping plate arranged in the plate receiving recess formed on the first disc substrate being supported by part of the projecting section arranged on the second disc substrate; and a cartridge main body for rotatably containing the optical disc;

the optical disc being rotatably contained in the cartridge main body with the raised section exposed to a driving aperture formed at one of the opposite sides of the cartridge main body, a rotary drive mechanism for driving the optical disc to rotate being at least partly exposed to the driving aperture.

10. The disc cartridge according to claim 9, wherein a recording/reproduction aperture is formed on at least one of the surfaces of the cartridge main body of the disc cartridge to expose the signal recording region of the optical disc contained in the cartridge main body to the outside from the inner periphery to the outer periphery thereof.

11. The disc cartridge according to claim 9, wherein a disc supporting section is arranged in the cartridge main body to support the non-signal-recording region of the optical disc that is arranged at the inner peripheral side of the optical disc contained in the cartridge main body.

* * * * *

UNITED STATES PATENT AND TRADEMARK OFFICE
CERTIFICATE OF CORRECTION

PATENT NO. : 7,318,232 B2 Page 1 of 1
APPLICATION NO. : 11/064094
DATED : January 8, 2008
INVENTOR(S) : Shin Masuhara et al.

It is certified that error appears in the above-identified patent and that said Letters Patent is hereby corrected as shown below:

Column 10, line 65, change "fist" to -- first --

Column 12, line 16, change "sufficient" to -- sufficiently --

Column 14, line 16, change "above" to -- absorb --

Signed and Sealed this

Eighth Day of July, 2008

JON W. DUDAS
*Director of the United States Patent and Trademark Office*